## 2,927,107

PROCESS OF MAKING N,N-DIBENZYL PEPTIDES

Leon Velluz, Paris, Jesus Anatol, Neuilly-sur-Seine, and Gaston Amiard, Noisy-le-Sec, France, assignors to UCLAF, Paris, France, a body corporate of France No Drawing. Application February 16, 1955
Serial No. 488,701

Claims priority, application France August 5, 1954

3 Claims. (Cl. 260—112)

The present invention relates to new peptides and more particularly to new N-benzyl peptides and a process of making same.

In co-pending application Serial No. 488,702 by Gaston Amiard and Leon Velluz, filed on February 16, 1955, said application being entitled "New N-Benzyl Peptides and a Process of Making Same," a novel and simple process of producing peptides is disclosed. Said process does not have the disadvantages of the heretofore known processes of peptide synthesis and can be applied to a great number of amino acids.

In principle, the process according to said application Serial No. 488,702 consists in condensing the hydrochloride of an acid chloride of N-benzyl or N,N-dibenzyl-α-amino acids with the hydrochloride of a readily saponifiable ester of an amino acid and preferably with the benzyl ester of an amino acid. The resulting hydrochloride of an ester of an N-benzyl or N,N-dibenzyl peptide can readily be isolated and purified on account of its solubility in chloroform. By subsequent saponification by means of alkaline agents the N-benzyl or N,N-dibenzyl peptide is formed. Hydrogenolysis of said benzylated peptide, finally, yields the free peptide.

The N-benzyl peptides obtained as intermediates according to this process correspond to the following Formula I while the free peptides obtained on hydrogenolysis correspond to the following Formula II:

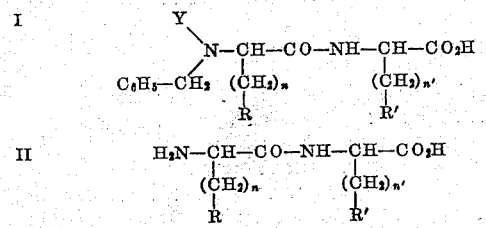

In these formulas

Y indicates hydrogen or the benzyl radical,

R indicates hydrogen, an alkyl, aryl or heterocyclic radical,

R' indicates hydrogen, an alkyl, aryl, or heterocyclic radical which is identical with or different from R and which may also contain a hydroxyl group, $n$ is a numeral from 0 to 8, and $n'$ is a numeral from 0 to 8 which may be identical with or different from $n$.

It is one object of the present invention to provide a new and very advantageous process of producing peptides and their N,N-dibenzyl substitution products which process does not have the disadvantages of the heretofore known processes and which can also be applied to a great number of amino acids.

Another object of the present invention is to provide new and valuable peptide compounds wherein at least one free amino group is substituted by two benzyl groups.

Still another object of the present invention is to provide new mixed anhydrides of N,N-dibenzyl substituted amino acids with other acids, said mixed anhydrides being especially suitable for conversion into peptides and their N,N-dibenzyl substitution products.

Other objects of the present invention and advantageous features thereof will become apparent as the description proceeds.

According to this new and advantageous process peptides are synthetically obtained by converting the N,N-dibenzyl substitution products of α-amino acids as they are obtained according to said application Serial No. 488,702 into suitable mixed anhydrides and preferably into mixed anhydrides with the esters of chloroformic acid.

The condensation of mixed anhydrides of α-amino acids wherein the amino group is protected, with amino acids or peptides wherein the carboxyl group is protected, has been described heretofore. Protection of the amino group renders the compounds soluble in organic solvents and, thereby, enables preparation of the mixed anhydrides. It also permits and facilitates isolation and crystallization of the intermediate peptide compounds. Protection of the amino group must be effected in such a manner that the amino group can readily be restored without splitting up of the peptide bond. Usually α-amino acids or peptides are used wherein the amino group is protected by the carbo-benzyloxy group or by the phthaloyl group. The carbo-benzyloxy group is introduced, for instance, by reacting the benzyl ester of chloroformic acid with α-amino acids or peptides. It is, however, rather difficult to obtain the resulting derivatives, in crystalline form. Another disadvantage is that condensation of such carbobenzyloxy compounds to the corresponding peptides proceeds with varying results. Furthermore frequently crystallization of the intermediate products is quite difficult due to their limited solubility. Sometimes hydrogenolysis of the N-carbo-benzyloxy peptide obtained thereby proceeds with great difficulty. All these disadvantages of the known processes are overcome when proceeding according to the advantageous embodiment of the present invention as described hereinafter.

The process of this advantageous embodiment of the present invention consists in reacting, at a temperature preferably near 0° C. and in an organic solvent such as, for instance, chloroform, an N,N-dibenzyl substituted α-amino acid or peptide with an agent capable of forming a mixed anhydride therewith, such as, for instance, the ethyl ester of chloroformic acid, in the presence of an acid binding agent and especially in the presence of an agent capable of binding hydrochloric acid, for instance, in the presence of triethylamine. The resulting solution of the mixed anhydride is directly treated, at a temperature preferably near 0° C., with an α-amino acid or a peptide the carboxyl groups of which are protected, for instance, by ester formation. Thereby the N,N-dibenzyl substituted peptide having its carboxyl group protected is obtained. Said compound can readily and directly be isolated and crystallized, preferably in the form of its hydrochloride or of the free N,N-dibenzyl substituted ester.

In contrast to heretofore used N-carbobenzyloxy derivatives used in the prior art processes of producing peptides, the N,N,-dibenzyl substituted amino acids according to the present invention are very stable compounds. They have the further advantage that they are readily soluble in most of the organic solvents, even in solvents which are immiscible with water, and that they yield well defined, stable N,N-dibenzyl substituted peptides which have a high melting point and are also soluble in most of the organic solvents. Isolation and recrystallization of the peptide condensation products, therefore, are facilitated and the yields obtained, in general, exceed 90% of the theoretical yield. During this reaction, the amino group retains its basic characteristic. Consequently, the hydrochlorides of said compounds can be prepared which are easy to handle. It represents an especially advantageous feature of the present invention that the resulting intermediates can also be purified very readily and that final hydrogenolysis proceeds quantitatively and very rapidly.

The following examples serve to illustrate the present invention without, however, limiting the same thereto. In place of the ethyl ester of chloroformic acid, there can be used other alkyl esters of chloroformic acid and, in place of triethylamine, other acid binding bases. It is also possible to use other indifferent solvents in place of chloroform.

The melting points given in the following examples are points of instantaneous melting determined on the Maquenne block.

EXAMPLE 1

*Preparation of N,N-dibenzylglycyl glycine*

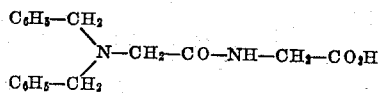

(a) Preparation of a solution of the mixed anhydride of mono-ethyl carbonate and dibenzyl glycine in chloroform:

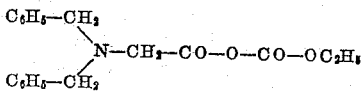

5.1 g. of dibenzyl glycine are dissolved by heating in 75 cc. of water-free chloroform. 3.5 cc. of triethylamine are added to said solution. The mixture is cooled to $-10°$ C. and 2.2 cc. of the ethyl ester of chloroformic acid are added thereto within about 30 minutes while keeping the temperature at $0°$ C. Thereby a solution of the mixed anhydride is obtained. Said solution can directly be used in the following reaction step.

N,N-dibenzyl glycine is obtained according to example 1 of the above mentioned application serial No. 488,702.

(b) Condensation of said mixed anhydride with the ethyl ester of glycine:

2.8 g. of the hydrochloride of the ethyl ester of glycine are dissolved in 25 cc. of chloroform at lukewarm temperature. 3.5 cc. of triethylamine are added thereto. The mixture is cooled to about $0°$ C. Thereupon the mixture is added to the chloroform solution of the mixed anhydride prepared as described hereinbefore under (a), which solution is preferably cooled to $-10°$ C. Speed of addition and cooling are adjusted in such a manner that the temperature of the reaction mixture remains below $0°$ C. Said temperature is maintained for about half an hour after all of the solution of the ester of the amino acid has been added. The temperature of the mixture is allowed to rise to room temperature and the mixture is kept at said temperature for one hour. After washing the reaction mixture in the usual manner, it is twice treated by means of 20 cc. of hydrochloric acid. Thereby, the ester of the dibenzyl peptide is converted into its hydrochloride. The solution is dried, evaporated to dryness, the residue is washed with ether, and dried. 7.5 g. of the hydrochloride of dibenzyl glycyl glycine ethyl ester are obtained in an almost quantitative yield. Melting point: 155–157° C. After recrystallization from a mixture of ethanol and ether (1:2), a product is obtained which melts at 160–161° C.

*Analysis.*—$C_{20}H_{24}O_3N_2HCl$.—Molecular weight: 376.9.
Calculated: 63.7% C; 6.7% H; 7.4% N; 9.4% Cl.
Found: 63.8% C; 6.7% H; 7.4% N; 9.6% Cl.

(c) Saponification of the hydrochloride of the ethyl ester of N,N-dibenzyl glycyl glycine.

4 g. of the crude non-recrystallized hydrochloride of said ester are dissolved in 7 cc. of a 20% solution of potassium hydroxide in methanol. The solution is heated under reflux for five minutes. First 15 cc. of water and then 3.6 cc. of acetic acid are added to said solution while still warm. Thereby a clear solution is obtained which is cooled slowly. The mixture is allowed to stand in ice for some time. The precipitate is filtered off, washed, and dried. 3 g. of N,N-dibenzyl glycyl glycine melting at 138–140° C. are obtained thereby. The yield is about 90% of the theoretical yield. The compound is soluble in acetic acid, insoluble in water and chloroform.

The resulting N,N-dibenzyl glycyl glycine is identical with the product described hereinbefore in Example 1 of said above mentioned application Serial No. 488,702. Said compound yields, on hydrogenolysis in acetic acid and in the presence of palladium black, glycyl glycine with an almost quantitative yield.

EXAMPLE 2

*Preparation of N,N-dibenzyl glycyl-DL-valine*

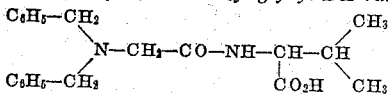

(a) Preparation of a solution of the mixed anhydride of mono-ethyl carbonate and dibenzyl glycine in chloroform:

This solution is prepared in the same manner as described in Example 1 by starting with 5.1 g. of N,N-dibenzyl glycine.

(b) Condensation of the mixed anhydride with the ethyl ester of DL-valine:

The procedure is the same as described in Example 1 under (b) whereby a chloroform solution of 3.65 g. of the hydrochloride of the ethyl ester of DL-valine in 36 cc. of chloroform and 3.5 cc. of triethylamine are employed. 7.7 g. of the hydrochloride of the ethyl ester of N,N-dibenzyl glycyl-DL-valine melting at 140° C. are obtained. The yield is 92% of the theoretical yield. The compound is recrystallized from a mixture of ethyl acetate and petroleum ether (1:2). Its melting point is 140–145° C. The compound is soluble in water, ethanol, chloroform, and benzene, and is insoluble in ether.

*Analysis.*—$C_{23}H_{31}O_3N_2Cl$.—Molecular weight: 419.0.
Calculated: 65.9% C; 7.5% H; 6.7% N; 8.5% Cl.
Found: 66.2% C; 7.5% H; 6.6% N; 8.6% Cl.

(c) Saponification of the hydrochloride of the ethyl ester of N,N-dibenzyl glycyl-DL-valine:

The ester obtained as described above is dissolved in 78 cc. of methanol. 20 cc. of 2 N sodium hydroxide solution are added thereto and the mixture is allowed to stand overnight. Thereafter 2.5 cc. of acetic acid are added and the mixture is diluted with 80 cc. of water. The methanol is evaporated by distillation in a vacuum at 50° C. The precipitate is filtered off and washed. 6.3 g. of N,N-dibenzyl glycyl-DL-valine, corresponding to a yield of 95% of the theoretical yield, are obtained thereby. The melting point is 125–127° C. On recrystallization from a mixture of ethyl acetate and petroleum ether (1:1) a compound is obtained which melts at 127–128° C. Said compound is soluble in ethanol and chloroform and insoluble in petroleum ether.

*Analysis.*—$C_{21}H_{26}O_3N_2$.—Molecular weight: 354.4.
Calculated: 71.2% C; 7.4% H; 13.5% O; 7.9% N;
Found: 71.4% C; 7.4% H; 13.4% O; 7.8% N.

EXAMPLE 3

*Preparation of glycyl-DL-valine by hydrogenolysis of N,N-dibenzyl glycyl-DL-valine*

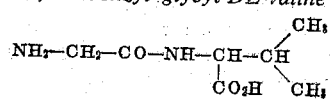

Hydrogenolysis is effected in the presence of palladium black. Said palladium black is obtained by hydrogenating a mixture of 1.75 g. of vegetable charcoal and 8.75 cc. of a 2% solution of palladium chloride. The catalyst is separated from said hydrogenation mixture by filtration and is added to 3.5 g. of N,N-dibenzyl glycyl-DL-valine obtained according to Example 2 and dissolved in 108 cc. of 50% ethanol. The mixture is heated to 70° C. and hydrogen is introduced while stirring. The theoretical amount of hydrogen is absorbed within about one hour. The catalyst is filtered off, the filtrate is evaporated to dryness, and the residue is dissolved in ethanol. In this manner 1.5 g. of glycyl-DL-valine, corresponding to a yield of 87% of the theoretical yield, are obtained. On recrystallization from aqueous ethanol (6:1) the compound melts at about 250° C.

*Analysis.*—$C_7H_{14}O_3N_2$.—Molecular weight: 174.2. Calculated: 48.3% C; 8.1% H; 27.5% O; 16.1% N. Found: 48.5% C; 8.1% H; 27.7% O; 15.9% N.

Hydrogenolysis can also be effected in solution in 10 parts by volume of acetic acid. When working in said solvent, hydrogenation is completed within 10 minutes. The yield amounts to 92%.

EXAMPLE 4

*Preparation of N'-(N,N-dibenzyl glycyl)-DL-serine*

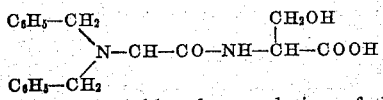

(a) Preparation of a chloroform solution of the mixed anhydride of mono-ethyl carbonate and dibenzyl glycine:

Said solution is prepared as described hereinbefore in Example 1, whereby 2.55 g. of dibenzyl glycine are reacted in 40 cc. of chloroform with 1.2 cc. of the ethyl ester of chloroformic acid with the addition of 2 cc. of triethylamine.

(b) Condensation of said mixed anhydride with the ethyl ester of DL-serine:

The procedure is the same as described hereinbefore in Example 1 under (b), whereby a solution of 1.7 g. of the hydrochloride of the ethyl ester of DL-serine in 17 cc. of chloroform is used and 2 cc. of triethylamine are added to the reaction mixture. 3.9 g. of the hydrochloride of the ethyl ester of N'-(N,N-dibenzyl glycyl)-DL-serine melting at 156° C. are obtained thereby. The yield amounts to 95% of the theoretical yield. On recrystallization from a mixture of ethanol and ether (1:4) a compound melting at 160° C. is obtained.

*Analysis.*—$C_{21}H_{27}O_4N_2Cl$.—Molecular weight: 406.91. Calculated: 61.98% C; 6.69% H; 15.73% O; 6.89% N; 8.71% Cl. Found: 62.1% C; 6.8% H; 16.1% O; 6.6% N; 9.1% Cl.

(c) Saponification of the hydrochloride of the ethyl ester of N'-(N,N-dibenzyl glycyl)-DL-serine:

The procedure is the same as described hereinbefore in Example 1 under (c) whereby 1 g. of hydrochloride of the above described ethyl ester are saponified by means of 2 cc. of a 20% potassium hydroxide solution in methanol. The saponification mixture is acidified by means of acetic acid. The acidified mixture is extracted with chloroform. The chloroform solution is dried over magnesium sulfate and is evaporated to dryness. The residue is dissolved in 2.5 cc. of hydrochloric acid while heating. By cooling the resulting solution the hydrochloride of N'-(N,N-dibenzyl glycyl)-DL-serine precipitates and is recovered from the reaction mixture. The compound is identical with the product obtained according to Example 13 of said above mentioned copending application Serial No. 488,702.

On hydrogenolysis of said compound by means of palladium black under the conditions described hereinbefore in Example 3 N-glycyl-DL-serine is obtained.

EXAMPLE 5

*Preparation of N,N-dibenzyl glycyl-L-glutamic acid*

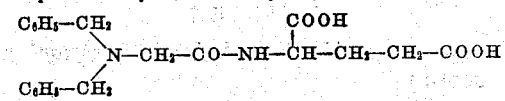

(a) Preparation of a solution of the mixed anhydride of mono-ethyl carbonate and dibenzyl glycine in chloroform:

The solution is prepared according to the procedure described hereinbefore in Example 1 by starting with 5.1 g. of dibenzyl glycine.

(b) Condensation of the mixed anhydride with the diethyl ester of L-glutamic acid:

The procedure is the same as described hereinbefore in Example 1 (under (b)) whereby 4.8 g. of the hydrochloride of the diethyl ester of L-glutamic acid are dissolved in 25 cc. of chloroform and 3.5 cc. of triethylamine are added thereto. As final reaction product, there are obtained 8.5 g. of the hydrochloride of the diethyl ester of N,N-dibenzyl glycyl-L-glutamic acid having a melting point of 120° C. The yield is 90% of the theoretical yield. On recrystallization from a mixture of ethyl acetate and ether (1:5) the compound melts at 120–122° C. The salt is soluble, in the cold, in ethanol, chloroform, soluble, on heating, in ethyl acetate, benzene, and acetone, and insoluble in water and ethers.

*Analysis.*—$C_{25}H_{33}O_6N_2Cl$.—Molecular weight: 477. Calculated: 62.95% C; 6.97% H; 5.87% N; 7.43% Cl. Found: 63.1% C; 7.0% H; 5.7% N; 7.6% Cl.

(c) Saponification of the hydrochloride of the diethyl ester of N,N-dibenzyl glycyl-L-glutamic acid:

The procedure is the same as disclosed in Example 2 under (c) whereby 8.5 g. of the above indicated diester dissolved in 100 cc. of methanol are saponified by the addition of 33 cc. of 2 N sodium hydroxide solution. Thereby 6.5 g. of N,N-dibenzyl glycyl-L-glutamic acid, corresponding to a yield of 95% of the theoretical yield are obtained as the final reaction product. Its melting point is 176–177° C. On recrystallization from a mixture of water and ethanol (2:3) small leaflets melting at 176–178° C. are obtained. The compound is soluble in alcohols and insoluble in water.

*Analysis.*—$C_{21}H_{24}O_5N_2$.—Molecular weight: 384.42. Calculated: 65.61% C; 6.29% H; 20.81% O; 7.29% N. Found: 65.8% C; 6.2% H; 20.9% O; 7.4% N.

EXAMPLE 6

*Preparation of glycyl-L-glutamic acid by hydrogenoylsis of N,N-dibenzyl glycyl-L-glutamic acid*

The procedure is the same as described in Example 3 whereby 7 g. of the dibenzyl substituted peptide dissolved in a mixture of 100 cc. of ethanol and 30 cc. of water are subjected to hydrogenation. The palladium black catalyst is obtained by hydrogenating a mixture of 3.5 g. of vegetable charcoal and 17.5 cc. of a 2% aqueous solution of palladium chloride. 3.7 g. of the desired peptide corresponding to a yield of 97% are obtained by said hydrogenation. On recrystallization from a mixture of water and ethanol (1:4) the pure compound is obtained in magnificant triangular or pentagonal leaflets which are very stable on exposure to air and have a melting point of 160° C. The compound contains half a molecule of water of crystallization.

*Analysis.*—$C_7H_{12}O_5N_2$.—Molecular weight: 204.19. Calculated: 41.17% C; 5.93% H; 39.18% O; 13.72% N. Found: 41.4% C; 5.9% H; 39.3% O; 13.5% N.

This example illustrates the importance of the process according to the present invention and the advantages achieved thereby. Since the intermediate products can readily be purified, it is possible to obtain glycyl glutamic acid in crystalline and very stable form while said acid could be obtained heretofore in amorphous form only and it was quite unstable on exposure to air.

EXAMPLE 7

*Preparation of N,N-dibenzyl glycyl-DL-tryptophan*

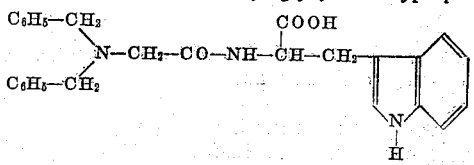

(a) Preparation of a solution of the mixed anhydride of mono-ethyl carbonate and dibenzyl glycine in chloroform:

Said solution is obtained as described in Example 1 by starting with 2.6 g. of dibenzyl glycine.

(b) Condensation of the mixed anhydride with the methyl ester of tryptophan:

(1) The procedure is the same as described in Example 1 under (b) whereby a solution of 2.5 g. of the hydrochloride of the methyl ester of DL-tryptophan, dissolved in 25 cc. of chloroform is used and 1.75 cc. of triethylamine are added. As final reaction product there are obtained 5 g. of the crude hydrochloride of the methyl ester of N,N-dibenzyl glycyl-DL-tryptophan. The yield is almost quantitative.

Said product is sufficiently pure to be directly saponified to N,N-dibenzyl glycyl-DL-tryptophan. The hydrochloride is soluble in chloroform, alcohols, methyl ethyl ketone, acetone, dichloro ethane, slightly soluble in benzene, and insoluble in water and ethers.

(2) Instead of producing and isolating the hydrochloride of the methyl ester of N,N-dibenzyl glycyl-DL-tryptophan, it is also possible to directly isolate the free base. For this purpose, the procedure, initially, is the same as above described under (b)(1). When using three times the mentioned amounts of the mixed anhydride and the methyl ester of tryptophan as employed hereinbefore, the resulting chloroform solution of the reaction mixture is washed twice, each time with 20 cc. of water and thereafter twice with 20 cc. of a 5% sodium carbonate solution. The alkaline wash waters are extracted with chloroform and the combined chloroform extracts are washed with water to which a few drops of acetic acid were added in order to eliminate traces of sodium carbonate which might be present. The resulting washed chloroform solution is then dried over magnesium sulfate and is distilled to dryness. The residue amounts to 14 g. On recrystallization from ether, a first fraction of 10.5 g. of the methyl ester of DL-tryptophan, corresponding to a yield of 77%, is obtained. Its melting point is 110° C.

*Analysis.*—$C_{28}H_{29}O_3N_3$.—Molecular weight: 455.53. Calculated: 73.82% C; 6.42% H; 10.54% O; 9.22% N. Found: 73.7% C; 6.6% H; 10.2% O; 9.3% N.

To produce a product of analytical purity, the compound is dissolved in ethanol and water is added to the solution in order to reduce the ethanol concentration to 90% ethanol. The resulting compound melts at 120° C. It is soluble, in the cold, in acetone, ethyl acetate, chloroform, and dichloroethane, soluble, on heating, in ethanol, and insoluble in water, ether, isopropyl ether, petroleum ether, and cyclohexane.

(c) Saponification of the hydrochloride of the methyl ester of dibenzyl glycyl-DL-tryptophan:

The crude hydrochloride of the ester obtained as described hereinabove under (b)(1) is dissolved in 50 cc. of methanol in the presence of 15 cc. of 2 N sodium hydroxide solution. This solution is allowed to stand overnight, and part of the methanol is removed by distillation in a vacuum. Thereby, the sodium salt precipitates. The mixture is heated until solution has taken place, and is then acidified by means of acetic acid. The free dibenzyl substituted peptide precipitates quite rapidly. The mixture is triturated with water and is filtered. The resulting product contains water of crystallization. It is heated with 25 cc. of benzene on the water bath. Thereby it first dissolves but then starts to crystallize. 15 cc. of benzene are added thereto and the mixture is subjected to distillation in order to eliminate the water, by azeotropic distillation. After allowing the remaining solution to stand for two hours, the precipitated dibenzyl glycyl-DL-tryptophan is filtered and dried. 3.8 g. of said compound, melting at 140° C., are obtained. The yield is 86% of the theoretical yield.

For analytical purposes the compound is recrystallized from 15 to 20 parts by volume of warm ethyl acetate. The resulting compound, after drying, has a melting point of 165–168° C. It is soluble in acetic acid, soluble, on heating, in acetone, ethanol, dichloroethane, and ethyl acetate, and insoluble in water and ethers.

*Analysis.*—$C_{27}H_{27}O_3N_3$.—Molecular weight: 441.51. Calculated: 73.45% C; 6.17% H; 10.87% O; 9.52% N. Found: 73.5% C; 6.2% H; 11.1% O; 9.6% N.

EXAMPLE 8

*Preparation of glycyl-DL-tryptophan by hydrogenolysis of N,N-dibenzyl glycyl-DL-tryptophan*

4 g. of the crude dibenzyl substituted peptide melting at 140° C. as obtained according to the preceding Example 7 are dissolved in 32 cc. of ethanol (corresponding to 8 parts by volume). 9 cc. of N hydrochloric acid are added thereto in order to produce the hydrochloride. Thereafter, 2 g. of palladium black, prepared as described hereinbefore from 2 g. of charcoal and 10 cc. of a 2% aqueous solution of palladium chloride, are added and the mixture is hydrogenated while stirring and heating. The theoretical amount of hydrogen is absorbed within 20 minutes. The catalyst is filtered off and is washed first with ethanol and then with water. The ethanol is removed from the combined filtrates by distillation on a water bath. After cooling, the reaction mixture is neutralized by means of sodium hydroxide solution and is acidified by means of acetic acid to a pH of 4.0. Glycyl-DL-tryptophan crystallizes. After filtration and drying, it is obtained in a yield of 85% of the theoretical yield. It is purified by preparing its sodium salt by dissolving 1 part of the crude compound in 20 parts by volume of ethanol and 0.4 part by volume of 10 N sodium hydroxide solution while heating. On acidifying the sodium salt solution by means of acetic acid, pure glycyl tryptophan, melting at 285° C., is obtained.

*Analysis.*—$C_{13}H_{15}O_3N_2$.—Molecular weight: 261.27. Calculated: 59.76% C; 5.8% H; 18.37% O; 16.08% N. Found: 59.7% C; 5.9% H; 18.9% O; 15.9% N.

EXAMPLE 9

*Preparation of N'-(N,N-dibenzyl-DL-α-alanyl)-DL-α-amino butyric acid*

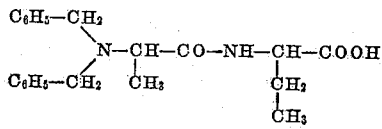

(a) Preparation of a solution of the mixed anhydride of mono-ethyl carbonate and N,N-dibenzyl-DL-alanine in chloroform:

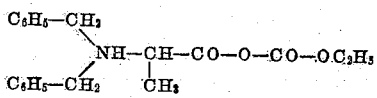

Said solution is prepared by using 8.1 g. of N,N-dibenzyl-DL-alanine, 80 cc. of chloroform, 5 cc. of triethylamine, and 3 cc. of the ethyl ester of chloroformic acid and proceeding as described in Example 1.

N,N-dibenzyl alanine is obtained, for instance, in an analogous manner as described for the preparation of N,N-dibenzyl glycine in Example 1 of application Serial No. 488,702.

(b) Condensation of the mixed anhydride with the ethyl ester of DL-α-amino butyric acid:

The procedure is the same as described hereinbefore in Example 1 under (b) whereby a solution of 5 g. of the ethyl ester of DL-amino butyric acid in 50 cc. of chloroform to which 5 cc. of triethylamine are added, is employed. As final reaction product there are obtained 11.85 g. of the hydrochloride of N'-(N,N-dibenzyl-DL-α-alanyl)-DL-α-amino butyric acid ethyl ester. The yield corresponds to 94.5% of the theoretical yield. The melting point is 135–140° C. On recrystallization from a mixture of ethanol and petroleum ether (1:10), a compound having a melting point of 147–149° C. is obtained. Said compound is soluble, in the cold, in ethanol, soluble, on heating, in ethyl acetate, benzene, and dichloroethane, and insoluble in ethers and cyclohexane.

Analysis.—$C_{23}H_{31}O_3N_2Cl$.—Molecular weight: 419. Calculated: 65.93% C; 7.46% H; 6.69% N; 8.46% Cl. Found: 66.0% C; 7.6% H; 6.5% N; 8.4% Cl.

(c) Saponification of the hydrochloride of N'-(N,N-dibenzyl-DL-α-alanyl)-DL-α-amino butyric acid ethyl ester:

The procedure is the same as described in Example 2 under (c) whereby 4.2 g. of the hydrochloride of the ester resulting from the reaction described above under (b), 42 cc. of methanol, and 10.5 cc. of a 2 N sodium hydroxide solution are employed. The acid is set free and is extracted with chloroform. The residue obtained on evaporation of the solvent is triturated with ether and with petroleum ether. 3.43 g. of N'-(N,N-dibenzyl-DL-α-alanyl)-DL-α-amino butyric acid, corresponding to a yield of 97% of the theoretical yield, are obtained. The melting point of said acid is 107° C. The compound is recrystallized from a mixture of benzene and petroleum ether (1:2) and has then a melting point of 145° C. The compound is soluble in ethanol, fairly soluble in benzene, slightly soluble in ether, isopropyl ether, and dichloroethane, and insoluble in cyclohexane, petroleum ether, and water.

Analysis.—$C_{21}H_{26}O_3N_2$.—Molecular weight: 354.44. Calculated: 71.16% C; 7.40% H; 7.91% N. Found: 71.2% C; 7.5% H; 8.1% N.

EXAMPLE 10

Preparation of N'-(N,N-dibenzyl-DL-α-alanyl)-DL-tryptophan

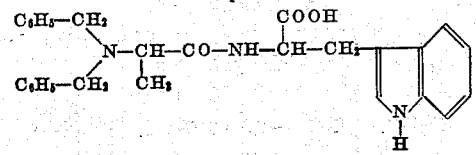

(a) Preparation of a solution of the mixed anhydride of mono-ethyl carbonate and N,N-dibenzyl-DL-α-alanine in chloroform:

Said solution is prepared as described hereinbefore by starting with 5.4 g. of dibenzyl alanine, 55 cc. of chloroform, 3.5 cc. of triethylamine, and 2.0 cc. of the ethyl ester of chloroformic acid.

(b) Condensation of the mixed anhydride with the methyl ester of DL-tryptophan:

The reaction is carried out by introducing into the solution of said mixed anhydride 5.1 g. of the hydrochloride of the methyl ester of tryptophan, dissolved in 50 cc. of chloroform, and 3.5 cc. of triethylamine. After treating the reaction mixture as described hereinbefore, 9.75 g. of the hydrochloride of the crude methyl ester of N'-(N,N-dibenzyl-DL-α-alanyl)-DL-tryptophan are obtained. The yield is 96.5% of the theoretical yield. The compound melts at 130–135° C.

To convert said hydrochloride into the free base, 2.75 g. thereof are dissolved in 3 parts by volume of warm ethanol and the calculated amount of sodium hydroxide, i.e. 2.75 cc. of a 2 N sodium hydroxide solution are added in order to neutralize the hydrochloride. Soon the free ester starts to crystallize. The reaction mixture is diluted with water, the precipitate is filtered off and dried. 2.5 g. of said free base corresponding to a yield of 98% of the theoretical yield are obtained. The compound melts at 150–155° C. In order to purify said compound, it is dissolved in 30 cc. of ethanol while heating. The solution is filtered in order to remove insoluble impurities, and water in an amount corresponding to the volume of said solution is added thereto. After filtration and drying, the resulting methyl ester of N'-(N,N-dibenzyl-DL-α-alanyl)-DL-tryptophan melting at 162–164° C. is obtained.

Analysis.—$C_{29}H_{31}O_3N_3$.—Molecular weight: 469.56. Calculated: 74.17% C; 6.66% H; 10.22% O; 8.95% N. Found: 74.3% C; 6.8% H; 11.0% O; 8.9% N.

Said compound is insoluble in water and only slightly soluble in ethanol.

(c) Saponification of the methyl ester of N'-(N,N-dibenzyl-DL-α-alanyl)-DL-tryptophan:

2.15 g. of the above described ester are dissolved in 22 cc. of acetone and 4.6 cc. of a 2 N sodium hydroxide solution and 11 cc. of methanol are added thereto. After allowing the reaction mixture to stand overnight, water is added and the mixture is acidified by the addition of the calculated amount of acetic acid. After filtration, washing with water, and drying, 2 g. of N'-(N,N-dibenzyl-DL-α-alanyl)-DL-tryptophan melting at 220° C. are obtained. The yield amounts to 98.5% of the theoretical yield. On recrystallization from a mixture of acetic acid and water (1:1) the compound has a melting point of 223° C. It forms needles which are soluble, on heating, in acetic acid and methyl ethyl ketone and only slightly soluble in ethanol. The compound is insoluble in chloroform, water, ethyl acetate, and ethers.

Analysis.—$C_{28}H_{29}O_3N_3$.—Molecular weight: 455.53. Calculated: 73.82% C; 6.42% H; 10.54% O; 9.22% N. Found: 73.8% C; 6.6% H; 10.7% O; 9.3% N.

EXAMPLE 11

Preparation of N'-(N,N-dibenzyl-DL-α-amino butyroyl) glycine

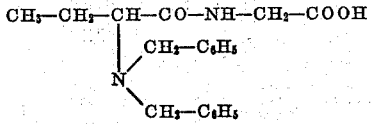

(a) Preparation of a solution of the mixed anhydride of mono-ethyl carbonate and N,N-dibenzyl-DL-α-amino butyric acid in chloroform:

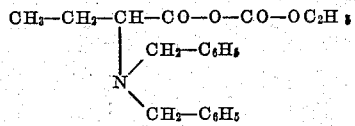

Said solution is prepared according to the procedure described hereinbefore in Example 1 by starting with 2.83 g. of N,N-dibenzyl-DL-α-amino butyric acid, 20 cc. of chloroform, 1.7 cc. of triethylamine, and 1.2 cc. of the ethyl ester of chloroformic acid.

Said N,N-dibenzyl-DL-α-amino butyric acid is obtained in an analogous manner as described for the preparation of N,N-dibenzyl glycine in Example 1 of application Serial No. 488,702.

(b) Condensation of the mixed anhydride with the ethyl ester of glycine:

The procedure is the same as described hereinbefore in Example 1 under (b) whereby a solution of 1.39 g. of the hydrochloride of the ethyl ester of glycine in 25 cc. of chloroform is reacted in the presence of 1.7 cc. of triethylamine with the above mentioned mixed anhydride. As final reaction product, there are obtained 2.8 g. of the hydrochloride of the ethyl ester of N'-(N,N-dibenzyl-DL-α-amino butyroyl) glycine of the melting point 133° C. The yield is 70% of the theoretical yield. On recrystallization from a mixture of ethanol and ether (1:6), the melting point of the resulting pure compound is raised to 140° C. The compound is soluble, in the cold, in benzene and dichloroethane, soluble, on heating in ethyl acetate, and insoluble in ethers and cyclohexane.

*Analysis.*—$C_{22}H_{29}O_3N_2Cl$.—Molecular weight: 404.93. Calculated: 65.25% C; 7.22% H; 6.92% N; 8.76% Cl. Found: 65.4% C; 7.3% H; 6.7% N; 9.0% Cl.

(c) Saponification of the hydrochloride of the ethyl ester of N'-(N,N-dibenzyl-DL-α-amino butyroyl) glycine;

The hydrochloride of the crude ester obtained as described hereinbefore is not crystallized by trituration with ether but is directly dissolved in 44 cc. of methanol. 11 cc. of N sodium hydroxide solution are added to said solution. The mixture, after standing for some time, is diluted with water and acidified with acetic acid. The resulting N'-(N,N-dibenzyl-DL-α-amino butyroyl) glycine is extracted with chloroform. The chloroform extract is evaporated to dryness. The evaporation residue is dissolved in ethyl acetate. 8 cc. of ethyl acetate containing 4.57% of hydrochloric acid are added thereto. The hydrochloride of the N'-(N,N-dibenzyl-DL-α-amino butyroyl) glycine crystallizes. 3.66 g. thereof, melting at 175° C. are obtained thereby. The yield is 97% of the theoretical yield. On recrystallization from a mixture of ethanol and isopropyl ether (3:13), the melting point of said compound remains unchanged. The hydrochloride of said dibenzyl substituted peptide is obtained in the form of needles or prisms which are soluble, in the cold, in methanol and insoluble in most of the other organic solvents.

*Analysis.*—$C_{20}H_{25}O_3N_2Cl$.—Molecular weight: 376.88. Calculated: 63.73% C; 6.69% H; 7.43% N; 9.41% Cl. Found: 63.8% C; 6.8% H; 7.0% N; 9.3% Cl.

EXAMPLE 12

*Preparation of N'-(N,N-dibenyl-DL-α-amino butyroyl)-DL-α-amino butyric acid*

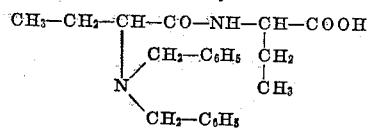

(a) Preparation of a solution of the mixed anhydride of mono-ethyl carbonate with N,N-dibenzyl-DL-α-amino butyric acid in chloroform:

Said solution is prepared according to the procedure described in Example 11 under (a) and with the same amounts of reactants as given therein.

(b) Condensation of the mixed anhydride with the ethyl ester of DL-α-amino butyric acid:

The procedure is the same as described hereinbefore in Example 1 under (b) by employing a solution of 1.68 g. of the hydrochloride of the ethyl ester of α-amino butyric acid in 20 cc. of chloroform with the addition of 1.7 cc. of triethylamine. As final reaction product, there are obtained 3.4 g. of the hydrochloride of N'-(N,N-dibenzyl-DL-α-amino butyroyl)-DL-α-amino butyric acid ethyl ester melting at 127° C. The yield is 79% of the theoretical yield. On recrystallization from a mixture of ethanol and ether (1:8), the melting point of said compound is raised to 148° C. The compound is soluble, in the cold, in benzene, methanol, ethanol, and chloroform, fairly soluble in ethyl acetate and dichloroethane, and insoluble in ethers and cyclohexane.

*Analysis.* — $C_{24}H_{33}O_3N_2Cl$. — Molecular weight: 433. Calculated: 66.57% C; 7.68% H; 6.47% N; 8.19% Cl. Found: 66.6% C; 7.8% H; 6.4% N; 8.3% Cl.

(c) Saponification of the hydrochloride of N'-(N,N-dibenzyl-DL-α-amino butyroyl) - DL - α-amino butyric acid ethyl ester:

The crude hydrochloride of the ester obtained as described hereinabove under (b) is saponified according to the procedure described in Example 2 under (c) by employing 26 cc. of methanol and 7 cc. of sodium hydroxide solution. After acidifying the reaction mixture and distilling off the methanol, the resulting N'-(N,N-dibenzyl-DL-α-amino butyroyl)-DL-α-amino butyric acid is extracted by means of ethyl acetate. The calculated amount of a 4.5% hydrochloric acid solution in ethyl acetate as required to form the hydrochloride, is added to said extract. As soon as the compound starts to crystallize, 4 parts by volume of isopropyl ether are added thereto. The precipitated compound is filtered off, washed, and dried. The hydrochloride of the N,N-dibenzyl substituted peptide is obtained in a yield corresponding to 85% of the theoretical yield. On recrystallization from 2 parts by volume of ethanol to which an amount of ether necessary to start crystallization is added, the hydrochloride of N'-(N,N-dibenzyl-DL-α-amino butyroyl)-DL-α-amino butyric acid is obtained in the form of tablets melting at 175° C. The compound is soluble, in the cold, in methanol, ethanol, and chloroform, and is insoluble in dichloroethane and ether.

*Analysis.*—$C_{22}H_{29}O_3N_2Cl$.—Molecular weight: 404.93. Calculated: 65.25% C; 7.22% H; 11.85% O; 6.92% N; 8.76% Cl. Found: 65.3% C; 7.5% H; 11.9% O; 6.8% N; 8.6% Cl.

To set the acid free from its hydrochloride, the hydrochloride is dissolved in sodium hydroxide solution in a slight excess (5%) and the solution is acidified by means of acetic acid. The mixture is extracted with chloroform, the chloroform extract is washed and dried and 2½ parts by volume of ether are added thereto. The resulting N'-(N,N-dibenzyl-DL-α-amino butyroyl)-DL-α-amino butyric acid is recrystallized from dichloroethane. Its melting point is 155° C. The acid is soluble in chloroform, methanol, and ethanol, and fairly soluble, on heating, in dichloroethane and ethyl acetate.

*Analysis.* — $C_{22}H_{28}O_3N_2$. — Molecular weight: 368.46. Calculated: 71.71% C; 7.66% H; 7.61% N. Found: 71.5% C; 7.7% H; 7.8% N.

EXAMPLE 13

*Preparation of N'-(N,N-dibenzyl)-DL-α-amino butyroyl)-DL-tryptophan*

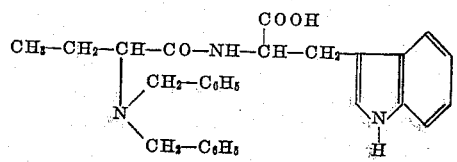

(a) Preparation of a solution of the mixed anhydride of mono-ethyl carbonate with N,N-dibenzyl-DL-α-amino butyric acid in chloroform:

Said solution is prepared according to the procedure described in Example 1 by employing 14.15 g. of N,N-dibenzyl-DL-α-amino butyric acid, 100 cc. of chloroform, 8.5 cc. of triethylamine, and 5.5 cc. of the ethyl ester of chloroformic acid.

(b) Condensation of the mixed anhydride with the methyl ester of DL-tryptophan:

The procedure is the same as described hereinabove in Example 1 under (b) by employing a solution of 12.75 g. of the hydrochloride of the methyl ester of DL-tryptophan in 125 cc. of chloroform with the addition of 8.5 cc. of triethylamine. As soon as the condensation is completed, the chloroform solution is washed with 0.2 N hydrochloric acid, thereafter with 0.2 N sodium hydroxide solution, and the wash waters are extracted with chloroform. The combined chloroform extracts are washed with water to which a few drops of acetic acid have been added. After drying, the solvent is removed by evaporation, the residue is dissolved in benzene, and the benzene solution is subjected to azeotropic distillation thereby eliminating water of crystallization present therein. The benzene solution is evaporated to dryness and the dry residue is recrystallized from isopropyl ether. 15.2 g. of the methyl ester of N'-(N,N-dibenzyl-DL-α-amino butyroyl)-DL-tryptophan, melting at 131° C., are obtained. The yield is 63% of the theoretical yield. On recrystallization from 90% methanol the compound is obtained in bright needles melting at 147–148° C. The ester is soluble in lower alcohols, insoluble in water, ethers, and petroleum ether.

Analysis. — $C_{30}H_{33}O_3N_3$. — Molecular weight: 483.58. Calculated: 74.51% C; 6.9% H; 8.7% N. Found: 74.3% C; 7.0% H; 8.6% N.

(c) Saponification of the methyl ester of N,N-dibenzyl-DL-α-amino butyroyl tryptophan:

The procedure is the same as described hereinbefore in Example 8 under (c) whereby 4.9 g. of the ester obtained as described hereinbefore, 50 cc. of acetone, 6 cc. of sodium hydroxide solution, and 20 cc. of methanol are employed. As final reaction product there are obtained 4 g. of N,N-dibenzyl-DL-α-amino butyroyl tryptophan melting at 217° C. The yield corresponds to 85% of the theoretical yield. On recrystallization from a mixture of ethanol and water, the melting point of said compound is raised to 220° C. The resulting dibenzyl substituted peptide is soluble, on heating, in acetic acid, ethanol, and methanol, and is insoluble in most of the other solvents.

Analysis. — $C_{29}H_{31}O_3N_3$. — Molecular weight: 469.56. Calculated: 74.17% C; 6.66% H; 10.22% O; 8.95% N. Found: 74.1% C; 6.5% H; 10.9% O; 8.8% N.

EXAMPLE 14

Preparation of N'-(N,N-dibenzyl-DL-norvalyl)-DL-tryptophan

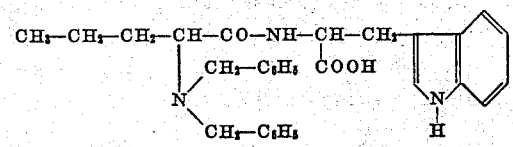

(a) Preparation of a solution of the mixed anhydride of mono-ethyl carbonate and N,N-dibenzyl-DL-norvaline in chloroform:

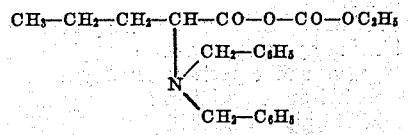

Said solution is prepared according to the procedure described in Example 1 by starting with 14.85 g. of N,N-dibenzyl-DL-norvaline, 120 cc. of chloroform, 8.5 cc. of triethylamine, and 5.3 cc. of the ethyl ester of chloroformic acid, the only difference in procedure being the use of non-crystallized N,N-dibenzyl-DL-norvaline obtained by evaporating a benzene solution of N,N-dibenzyl-DL-norvaline.

Said N,N-dibenzyl-DL-norvaline is prepared in an analogous manner as described for the preparation of N,N-dibenzyl glycine in Example 1 of application Serial No. 488,702.

(b) Condensation of the mixed anhydride with the methyl ester of DL-tryptophan:

The procedure is the same as described in Example 13 under (b) whereby 12.5 g. of the hydrochloride of the methyl ester of tryptophan are dissolved in 125 cc. of chloroform in the presence of 8.5 cc. of triethylamine and are used for the reaction with the mixed anhydride. The resulting methyl ester of N'-(N,N-dibenzyl-DL-norvalyl)-DL-tryptophan is isolated from the reaction mixture and is dissolved in 25 cc. of ethyl acetate. 40 cc. of petroleum ether are added to said solution and the ester is allowed to crystallize. The crystals are filtered off, washed with petroleum ether, and dried. 18.15 g. of the methyl ester of the dibenzyl substituted peptide melting at 99° C. are obtained thereby. The yield is 73% of the theoretical yield. On recrystallization from a mixture of methyl acetate and petroleum ether (1:1) long needles melting at 100° C. and containing half a molecule of ethyl acetate are obtained. On drying the compound in a vacuum at 100° C. the ethyl acetate is evaporated therefrom. The compound is soluble, in the cold, in methanol, ethanol, acetone, chloroform, dichloroethane, and benzene, soluble, on heating, in ethyl acetate, slightly soluble in ether and isopropyl ether, and insoluble in petroleum ether and water.

Analysis. — $C_{31}H_{35}O_3N_3$. — Molecular weight: 497.6. Calculated: 74.82% C; 7.09% H; 9.65% O; 8.44% N. Found: 75.1% C; 7.2% H; 9.7% O; 8.4% N.

(c) Saponification of the methyl ester of N'-(N,N-dibenzyl-DL-norvalyl)-DL-tryptophan:

The procedure is the same as described herein above in Example 13 under (c) whereby 5 g. of the above described ester, 50 cc. of acetone, 5.5 cc. of 2 N sodium hydroxide solution, and 20 cc. of methanol are employed. As final reaction product, there are obtained 4.2 g. of N'-(N,N-dibenzyl-DL-norvalyl)-DL-tryptophan melting at 198° C. The yield amounts to 94% of the theoretical yield. On recrystallization from aqueous ethanol (2:1), the melting point of the compound is raised to 201° C. The compound is fairly soluble, in the cold, in methanol, ethanol, acetone, fairly soluble, on heating, in benzene, chloroform, and dichloroethane, and insoluble in water and petroleum ether.

Analysis.—$C_{30}H_{33}O_3N_3$.—Molecular weight: 483.6. Calculated: 74.5% C; 6.9% H; 9.9% O; 8.7% N. Found: 74.4% C; 7.1% H; 10.0% O; 8.6% N.

EXAMPLE 15

Preparation of N'-(N,N-dibenzyl-DL-leucyl)-DL-tryptophan

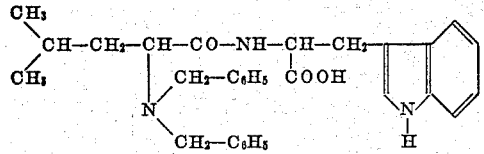

(a) Preparation of a solution of the mixed anhydride of mono-ethyl carbonate and N,N-dibenzyl-leucine in chloroform:

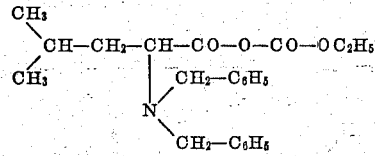

Said solution is prepared in the same manner as described in Example 1 by employing 12.46 g. of N,N-dibenzyl-leucine, 100 cc. of chloroform, 6.8 cc. of triethylamine, and 4.2 cc. of the ethyl ester of chloroformic acid. Said N,N-dibenzyl leucine is prepared in an analogous manner as described for the preparation of N,N-dibenzyl glycine in Example 1 of application Serial No. 488,702.

(b) Condensation of the mixed anhydride with the methyl ester of tryptophan:

The procedure is the same as described in Example 13 under (b) whereby 10.2 g. of the hydrochloride of the methyl ester of tryptophan dissolved in 120 cc. of chloroform are introduced into the solution of the above described anhydride and the condensation is carried out in the presence of 7 cc. of triethylamine. As final reaction product, there are obtained, after evaporation of the chloroform and dissolving the evaporation residue in isopropyl ether, 11.5 g. of the methyl ester of N'-(N,N-dibenzyl-DL-leucyl)-DL-tryptophan of the melting point 115° C. After repeated recrystallization, the melting point of said compound is raised to 121° C. The compound is obtained in the form of long needles containing half a molecule of isopropyl ether as solvent of crystallization. The isopropyl ether is removed therefrom by heating in a vacuum at 100° C. The compound is soluble in methanol, ethanol, acetone, benzene, ethyl acetate, and chloroform, soluble, on heating, in ether, and insoluble in cyclohexane, petroleum ether and water.

Analysis.—$C_{32}H_{37}O_3N_3$.—Molecular weight: 511.64. Calculated: 75.1% C; 7.3% H; 8.21% N. Found: 75.1% C; 7.3% H; 8.4% N.

(c) Saponification of the methyl ester of N'-(N,N-dibenzyl-DL-leucyl)-DL-tryptophan:

The procedure is the same as described in Example 13 under (c) whereby 5.2 g. of the ester, 50 cc. of acetone, 5.5 cc. of 2 N sodium hydroxide solution, and 20 cc. of methanol are employed. After saponification is completed, the reaction mixture is diluted with water, acidified by means of acetic acid, and extracted with chloroform. The chloroform extract is washed with water, dried over magnesium sulfate, and evaporated to dryness. An oil is obtained thereby which is dissolved in ethyl acetate. Ether is added to said solution in an amount which will no more cause turbidity in the supernatant liquid. The mixture is allowed to crystallize. The crystals are filtered off and dried. 4.3 g. of N'-(N,N-dibenzyl-DL-leucyl)-DL-tryptophan melting at 100–101° C. are obtained thereby. The yield corresponds to 94% of the theoretical yield. Said compound is recrystallized from 70% ethanol yielding the pure compound in the form of large crystals melting at 166–168° C. It is soluble in methanol, ethanol, propanol, and ethyl acetate.

Analysis.—$C_{31}H_{35}O_3N_3$.—Molecular weight: 497.61. Calculated: 74.82% C; 7.09% H; 9.65% O; 8.44% N. Found: 74.8% C; 7.2% H; 9.6% O; 8.4% N.

EXAMPLE 16

Preparation of N'-[(N,N-dibenzyl-DL-α-alanyl)-DL-tryptophyl]-DL-α-amino butyric acid

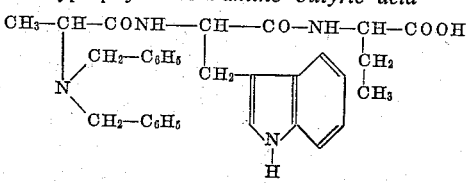

(a) Preparation of a solution of the mixed anhydride of mono-ethyl carbonate and N'-(N,N-dibenzyl-DL-α-alanyl)tryptophan in chlorofrom:

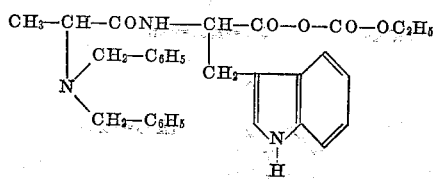

Said solution is obtained in the same manner as described in Example 1 whereby 4.56 g. of N'-(N,N-dibenzyl-DL-α-alanyl)-DL-tryptophan, prepared according to Example 10, 50 cc. of chloroform, 1.7 cc. of triethylamine, and 1.1 cc. of the ethyl ester of chloroformic acid are employed.

(b) Condensation of the mixed anhydride with the ethyl ester of DL-α-amino butyric acid:

The procedure is the same as described in Example 13 under (b) whereby 1.67 g. of the hydrochloride of the ethyl ester of DL-α-amino butyric acid, dissolved in 20 cc. of chloroform, are introduced into the solution of the above described mixed anhydride. Reaction is carried out with the addition of 1.7 cc. of triethylamine. As final reaction product there are obtained, after evaporation of the chloroform and trituration of the residue with ether, 4.5 g. of the ethyl ester of N'-(N,N-dibenzyl-DL-α-alanyl-DL-tryptophyl)-DL-α-amino butyric acid melting at 160° C. The yield amounts to 79% of the theoretical yield. After recrystallization from 95% ethanol the melting point of the compound is raised to 166° C. The compound is soluble in benzene, acetone, ethyl acetate, chloroform, dichloroethane, and insoluble in water, ether, isopropyl ether, cyclohexane, and petroleum ether.

Analysis.—$C_{34}H_{40}O_4N_4$.—Molecular weight: 568.7. Calculated: 71.8% C; 7.99% H; 11.25% O; 9.85% N. Found: 71.7% C; 7.2% H; 11.2% O; 9.9% N.

(c) Saponification of the ethyl ester of N'-[(N,N-dibenzyl-DL-α-alanyl)-DL-tryptophyl]-DL-α-amino butyric acid:

1.5 g. of the ethyl ester of N'-[(N,N-dibenzyl-DL-α-alanyl)-DL-tryptophyl]-DL-α-amino butyric acid in 20 cc. of acetone, 2 cc. of 2 N sodium hydroxide solution and thereafter 10 cc. of methanol are added thereto. The mixture is allowed to stand at room temperature for 24 hours and 30 cc. of water are added thereto. Methanol and acetone are removed by evaporation in a vacuum at a temperature below 40° C. The residue is acidified by means of 0.4 cc. of acetic acid and the precipitate is filtered off. In this manner, there are obtained, after washing with water, 1.42 g. of the N,N-dibenzyl substituted tripeptide. The yield is quantitative. The compound is recrystallized from 85% methanol. N'-[(N,N-dibenzyl-DL-α-alanyl)-DL-tryptophyl]-DL-α-amino butyric acid is obtained in the form of tablets which melt at 168° C. The compound is insoluble in ether, isopropyl ether, petroleum ether, water, and is soluble in alcohols and acetone.

Analysis.—$C_{32}H_{36}O_4N_4$.—Molecular weight: 540.46. Calculated: 71.09% C; 6.71% H; 10.36% N; 11.84% O. Found: 70.9% C; 6.9% H; 10.4% N; 11.9% O.

In place of chloroform, the most preferred solvent used in the preceding examples, there can be employed other indifferent organic solvents which do not react with and are not affected by the reactants, and especially organic solvents which do not contain hydroxyl groups, such as dichloroethane, tetrahydrofuran, dioxane, dimethylformamide, lower aliphatic halogenated and aromatic hydrocarbons.

In place of triethylamine used in the preceding examples as acid binding agent there can be employed other acid binding agents, and especially tertiary bases, such as pyridine, methyl ethyl pyridine, methyl pyridine, methyl piperidine, ethyl piperidine diethyl aniline, tributylamine.

In place of the ethyl ester of chloroformic acid used in the preceding examples to produce the mixed anhydrides forming the one reactant in the present process, there can be employed other alkyl esters of chloroformic acid or other agents capable of forming mixed anhydrides with N,N-dibenzyl substituted α-amino acids and peptides such as organic and mineral acids, their salts and esters generally used for this purpose.

In place of the methyl and ethyl esters of the second reaction components, the α-amino acids or peptides used in the preceding examples, there can be employed equimolecular amounts of other esters of such α-amino acids or peptides, for instance, the benzyl esters. Otherwise the procedure is the same as in said examples.

The new process as claimed hereinafter represents a remarkable improvement over the prior art processes of making di- and polypeptides and, therefore, will be of great value in the ultimate synthesis of protein-like compounds. The new compounds obtained thereby represent valuable intermediates in the synthesis of such protein-like compounds and may be used as such or after splitting off the benzyl residues for nutritional purposes, for instance, in place of protein hydrolysates. They permit the administration of very definite and specific peptides to overcome certain amino acid deficiencies and are of considerable advantage over such protein hydrolysates because they allow proper and precise dosage. The peptides can, of course, also be used for technical purposes in place of protein hydrolysates and the like.

We claim:

1. In a process of producing a polypeptide compound, the steps comprising dissolving a mixed anhydride of a mono-(lower) alkyl ester of carbonic acid and an amino carboxylic acid compound selected from the group consisting of an α-amino carboxylic acid and a peptide, the amino group of said amino carboxylic acid compound being substituted by two benzyl radicals, in a hydroxyl group-free organic solvent selected from the group consisting of chloroform, dichloro ethane, tetrahydrofuran, dimethyl formamide, and dioxane, adding to the resulting solution a solution of the hydrochloride of a lower alkyl ester of an amino carboxylic acid compound selected from the group consisting of an α-amino carboxylic acid and a peptide, in the same hydroxyl group-free organic solvent and a tertiary base selected from the group consisting of methyl and ethyl pyridine, methyl and ethyl piperidine, and a tri-(lower) alkylamine, at a temperature below 0° C., allowing the temperature of the reaction mixture to rise to room temperature to complete condensation, converting the resulting ester of the dibenzylated peptide by reaction with hydrochloric acid into its hydrochloride, recrystallizing said hydrochloride from an organic solvent, and saponifying the recrystallized hydrochloride of the lower alkyl ester of a dibenzylated peptide by means of alcoholic alkali metal hydroxide solution to yield the dibenzylated peptide with a free carboxyl group.

2. The process according to claim 1, wherein the hydrochloride of the lower alkyl ester of an amino carboxylic acid compound is the hydrochloride of the lower alkyl ester of an amino carboxylic acid compound selected from the group consisting of glycine, valine, serine, glutamic acid, tryptophan, and α-amino butyric acid.

3. In a process according to claim 1, wherein the mixed anhydride is an anhydride of mono-ethyl carbonate and an N,N-dibenzyl α-amino carboxylic acid compound selected from the group consisting of N,N-dibenzyl-DL-α-alanine, N,N-dibenzyl-DL-α-amino butyric acid, N,N-dibenzyl glycine, N,N-dibenzyl-DL-norvaline, N,N-dibenzyl-DL-leucine, and N'-(N,N-dibenzyl-DL-α-alanyl)-DL-tryptophan.

References Cited in the file of this patent

UNITED STATES PATENTS

| | | |
|---|---|---|
| 2,710,857 | Vaughan | June 14, 1955 |
| 2,713,045 | Wieland et al. | July 12, 1955 |
| 2,713,574 | Vaughan | July 19, 1955 |
| 2,723,973 | Herrick et al. | Nov. 15, 1955 |

OTHER REFERENCES

Neuberg et al.: Berichte, vol. 38, p. 2365 (1905).

Fischer: Untersuchungen fur aminosauren, polypeptide and Proteine II, p. 878 (1923), Berlin.

Anson et al.: Advances in Protein Chemistry, pp. 25–32, 36, 38 and 72, vol. 5 (1949), Academic Press Inc., N.Y.

Birkofer Berichte der Deut. Chem. Gesell., vol. 75, page 429 (1942).

Nickerson et al.: Chem. Abst., vol. 44, pp. 1195–6 (1950).

Kenner: "Chem. and Ind." p. 15 (1951).

Wieland: "Angewandte Chemie," vol. 63, p. 10 (1951).

Hartung et al.: Org. Reactions, vol. 7, pp. 264–5, 314 (1953), John Wiley and Sons, Inc., N.Y.